Jan. 26, 1943.   G. F. BAHR   2,309,333
BRACKET
Filed Aug. 30, 1939
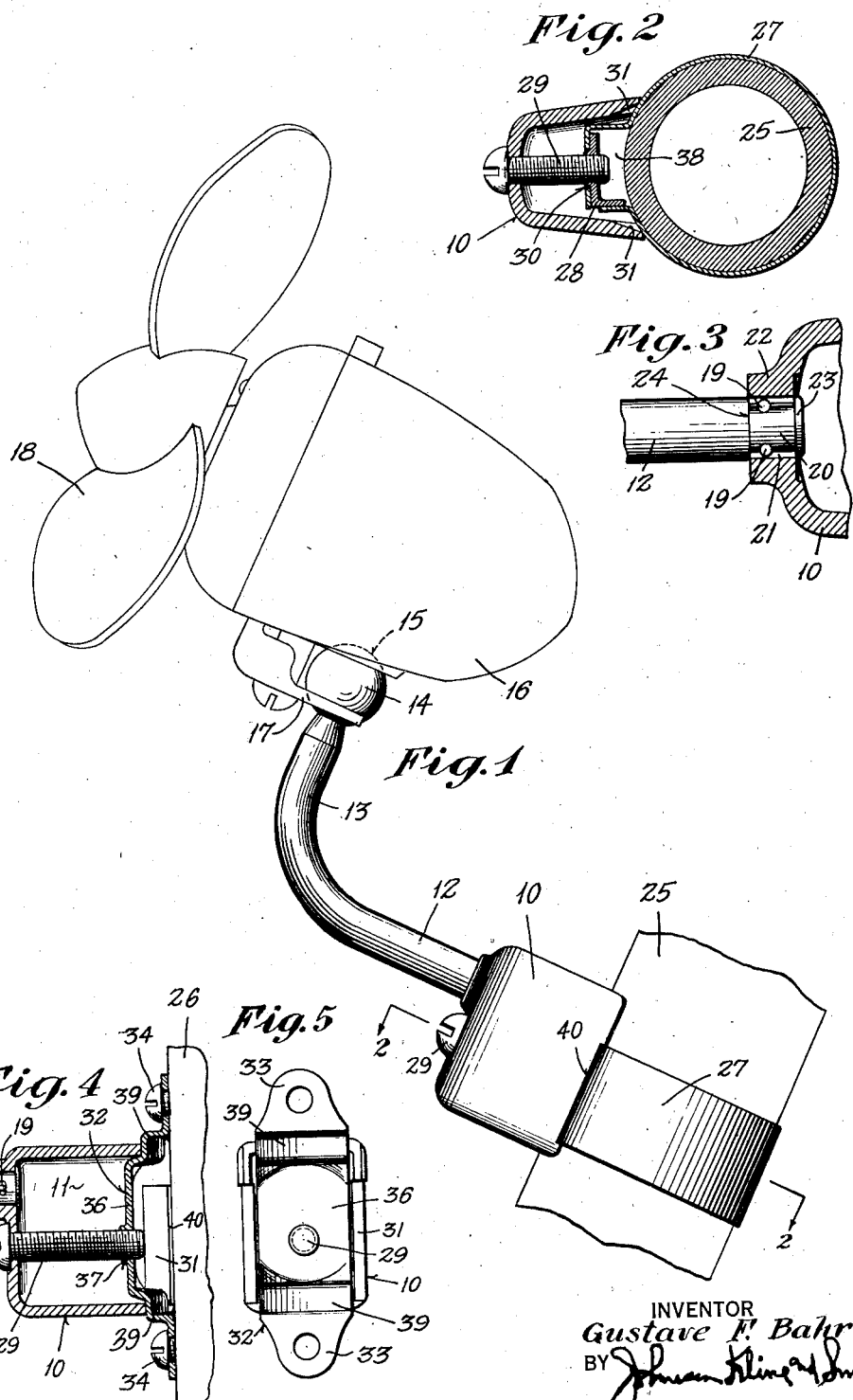
INVENTOR
Gustave F. Bahr
BY Johnson Kline Smyth
ATTORNEYS Patented Jan. 26, 1943

2,309,333

UNITED STATES PATENT OFFICE 2,309,333

BRACKET

Gustave F. Bahr, Bridgeport, Conn., assignor to Casco Products Corporation, Bridgeport, Conn., a corporation of Connecticut Application August 30, 1939, Serial No. 292,618

5 Claims. (Cl. 248—226)

This invention relates to supporting brackets, and more particularly to a bracket which may be used on cylindrical supporting members such as the steering column of an automobile, or on flat surfaces such as the header board of an automobile.

The bracket of the present invention is shown as applied to an electric fan which, when employed in an automobile, is usually mounted on a header board or on the steering column. Accordingly, the bracket of the present invention is provided with a rod, usually bent at right angles, and having at its free end a ball for cooperating with clamping parts carried by the electric fan casing.

Other features and advantages will hereinafter appear.

In the accompanying drawing, which shows one form of this invention, that at present preferred—

Figure 1 is a side elevation of the supporting device of the present invention, showing, in light lines, an electric fan carried thereby.

Fig. 2 is a transverse section through the bracket, taken on the line 2—2 of Fig. 1.

Fig. 3 is a sectional view through the bracket, showing the manner in which the supporting rod is secured to the clamping housing.

Fig. 4 is a longitudinal sectional view through the bracket of the present invention, showing the arrangement of the parts when the device is secured to the header board of an automobile.

Fig. 5 is an end view of the bracket arranged as shown in Fig. 4.

As shown in the accompanying drawing, the clamp housing 10 of the bracket is made hollow and has a cavity 11 carrying at its closed end a rod 12 which usually has a right-angle bend 13 and a terminal ball 14 adapted to engage a socket 15 in a fan casing 16 and held in the socket by a clamping plate 17.

In the embodiment of the invention herein illustrated, the fan casing 16 has at its front end a fan blade assembly 18. Such fans are used in automobiles to defrost the windshield as well as for general air circulation purposes.

The fan is adjusted relatively to the ball and rod 12 against the friction of the clamp 17, and hence the rod 12 is subjected to torsional or twisting strains at the point where it is mounted on the clamp housing 10. To prevent the rod from turning under such conditions, it is, as shown in Fig. 3 provided with a pair of splines 19 formed by swaging out the middle of the reduced end 20 of the rod, and these splines 19 are received in grooves 21 in the boss 22 of the housing 10, the end of the rod 12 being swaged over to form a head 23 on the inside of the boss while a shoulder 24 engages the outside of the boss.

The housing 10 is made hollow for two reasons—one, to receive a mounting strap, and, two, to receive a mounting blade—so that the bracket can be used in connection with cylindrical supporting columns or pipes, such as the steering column 25 of an automobile, or in connection with a flat surface, such as the header board 26 of an automobile.

Figure 2 shows the arrangement of the parts when the housing 10 receives a mounting strap 27. In this case, one end of the strap is secured, as by spot-welding, to a nut 28 threaded to receive a tightening screw 29, the other end of the strap having an aperture 30 through which the screw 29 passes in reaching the nut 28. The screw 29 passes through a hole in the end of the housing. When the bracket is to be secured to the steering column for instance, the screw 29 is removed, thereby permitting the ends of the strap 27 to be separated and wrapped around the steering column. The end of the strap having the aperture 30 is then placed over the nut 28 and passed into the cavity 11 of the housing 10. The apertured end and the nut-carrying end of the strap are bent outwardly so that these parts will project into the housing 10. The screw 29 is then projected through the aperture in the housing, and, after passing through the aperture 30 in the strap, is threaded into the nut 28. The screw 29 is then tightened to draw the ends of the strap 27 tightly around the column 25, and this is done by pulling the ends of the strap into the cavity 11. The side walls of the housing are chamfered at 31 so as to avoid any sharp edge which would cut into the strap when it is pulled into the housing.

It is sometimes desired to mount the fan or other device directly onto the header board of the automobile. To permit this to be done, the bracket is supplied with a plate 32 having at opposite ends apertured ears 33 to receive screws 34 whereby the plate may be fastened to the header board.

The plate 32 is made slightly narrower than the width of the cavity 11 in the housing 10, and has a central upwardly bent portion 36 which extends into the cavity 11 of the housing 10. This raised portion 36 has a screw-threaded aperture 37 adapted to receive the tightening screw 29 by means of which the housing 10 and the plate 32 may be united.

As will be observed from Fig. 2, the narrow walls 38 of the housing 10 have their ends concave to substantially conform to the curvature of the steering column 25. To fill in this concavity, the plate 32 is provided with an intermediate convex portion 39 to be received by the concave portion of the walls 38 as shown in Fig. 4. The raised portion 36 of the plate 32 snugly fits within the cavity 11 of the housing 10, and thus, with a single screw, the plate and housing 10 may be rigidly held together and against the housing turning relatively to the plate.

Likewise, when the mounting strap is used, the strap 27 snugly fits within a notch 40, as shown in Fig. 1, formed by the chamfering 31, and this keeps the housing 10 from shifting laterally relative to the strap when the strap and housing are tightly secured together by the screw 29.

The width of the housing 10 is made greater than the width of the strap 27, so that the plate 32 may be received in the cavity 11 of the housing. Nevertheless, the strap 27 is confined against movement lengthwise of the housing by the shoulders produced by the chamfering 31, and the screw 29 is so located that the edges of the strap and the nut 28 engage the adjacent narrow wall 38 of the housing.

Variations and modifications may be made within the scope of this invention, and portions of the improvements may be used without others.

I claim:

1. A bracket adapted to be mounted on a substantially cylindrical column, comprising a strap adapted to encircle the column; a housing carrying a supporting member, and having a cavity therein, open at one end, for receiving the ends of the strap; and draft means carried by the housing for engaging and drawing the ends of the strap into the cavity of said housing, the edges of the cavity in said housing being provided with notches for receiving the strap, the sides of the notches engaging the edges of the strap for preventing undesirable lateral shifting movement between the strap and the housing, and the bottom of the notches engaging and clamping the strap against the column at the line of engagement of the strap with the edge of said cavity.

2. A bracket adapted to be mounted on a substantially cylindrical column comprising a strap adapted to encircle the column; a housing carrying a supporting member and having a cavity therein, open at one end for receiving the ends of the strap; and draft means carried by the housing for engaging and drawing the ends of the strap into the cavity of said housing, opposite edges of the cavity in said housing having a notch of substantially the same breadth as said strap and of a depth to snugly receive the strap, the ends of the notches engaging said strap when the latter is drawn into the cavity to prevent undesirable lateral shifting movement between the strap and the housing, the inner edges of said notches being chamfered to prevent chafing of the strap, and said chamfered edges engaging and clamping the strap against the column at the line of their engagement with the strap when the draft means is tightened to draw the ends of the strap into the housing.

3. A bracket adapted to be mounted on a substantially flat surface, comprising a housing carrying a support member, said housing having a cavity open at one end; a mounting plate having flat terminal portions for engaging the flat surface, a raised portion intermediate said terminal portions adapted to extend into the cavity, and surfaces adjacent said raised portion conforming in shape to at least one pair of opposite edges of the cavity of the housing so as to engage those edges in abutting relation; a draft member extending through said housing and into the raised portion of said plate in a direction substantially normal to a plane of said plate-abutting edges of the housing cavity for securing the housing and plate together, the said surfaces of the plate, which form an abutment for the edges of the housing, supporting the thrust applied to the housing when the draft means is tightened; and means for securing said mounting plate to a flat surface.

4. The combination with a bracket adapted to be mounted on a cylindrical column, said bracket comprising a housing carrying a support member, said housing having a cavity open at one end, and opposite sides of the cavity having concavely curved edges shaped to conform to the curvature of said column, said bracket further including a draft member extending through the housing in a direction substantially normal to the plane of the opening in said cavity for engaging the ends of a strap encircling said column, to draw the strap ends into the cavity, thereby tightening the strap around the column and drawing the housing toward the column, of means for adapting said bracket to be mounted on a substantially flat surface, said means comprising a plate having a flat terminal portion for engaging said flat surface; a raised portion intermediate said terminal portions adapted to extend into the cavity of said housing and having means for engaging said draft means; and convexly curved surfaces on opposite sides of said raised portion, shaped to conform to the curved edges of said housing cavity, and engaging said curved edges in abutting relation when the housing is positioned against the plate so that the draft means can engage the raised portion thereof, said convex surfaces supporting the thrust applied to the housing when the draft means is tightened; and means for securing said plate to a flat surface.

5. The combination with a bracket adapted to be mounted on a cylindrical column, said bracket comprising a housing carrying a supporting rod, said housing having a cavity open at one end, and opposite sides of the cavity having concavely curved edges shaped to conform to the curvature of said column, and said bracket further including a draft member extending through the housing in a direction substantially normal to the plane of the opening in said cavity, for engaging the ends of a strap embracing said column to draw the ends of the strap into the cavity, thereby tightening the strap around the column and drawing the housing toward the column, of means for adapting said bracket to be mounted on a substantially flat surface, said means comprising a plate having flat apertured terminal ears adapted to lie against a flat surface and be secured thereto by means of screws; a raised portion intermediate said ears adapted to extend into the cavity and fitting snugly therein to prevent relative lateral displacement of the housing and the plate, the said raised portion having a threaded aperture for engaging said draft member; and convexly curved surfaces on opposite sides of said raised portion, shaped to conform to the curved edges of the said housing, and engaging said curved edges in abutting relation when the housing is positioned against the plate so that the draft means can engage the threaded aperture in the raised portion thereof, said convex surfaces supporting the thrust applied to the housing when the draft means is tightened.

GUSTAVE F. BAHR.